March 29, 1932.   W. L. HAMILTON   1,851,703
WEIGHING MACHINE
Filed May 12, 1922   3 Sheets-Sheet 1
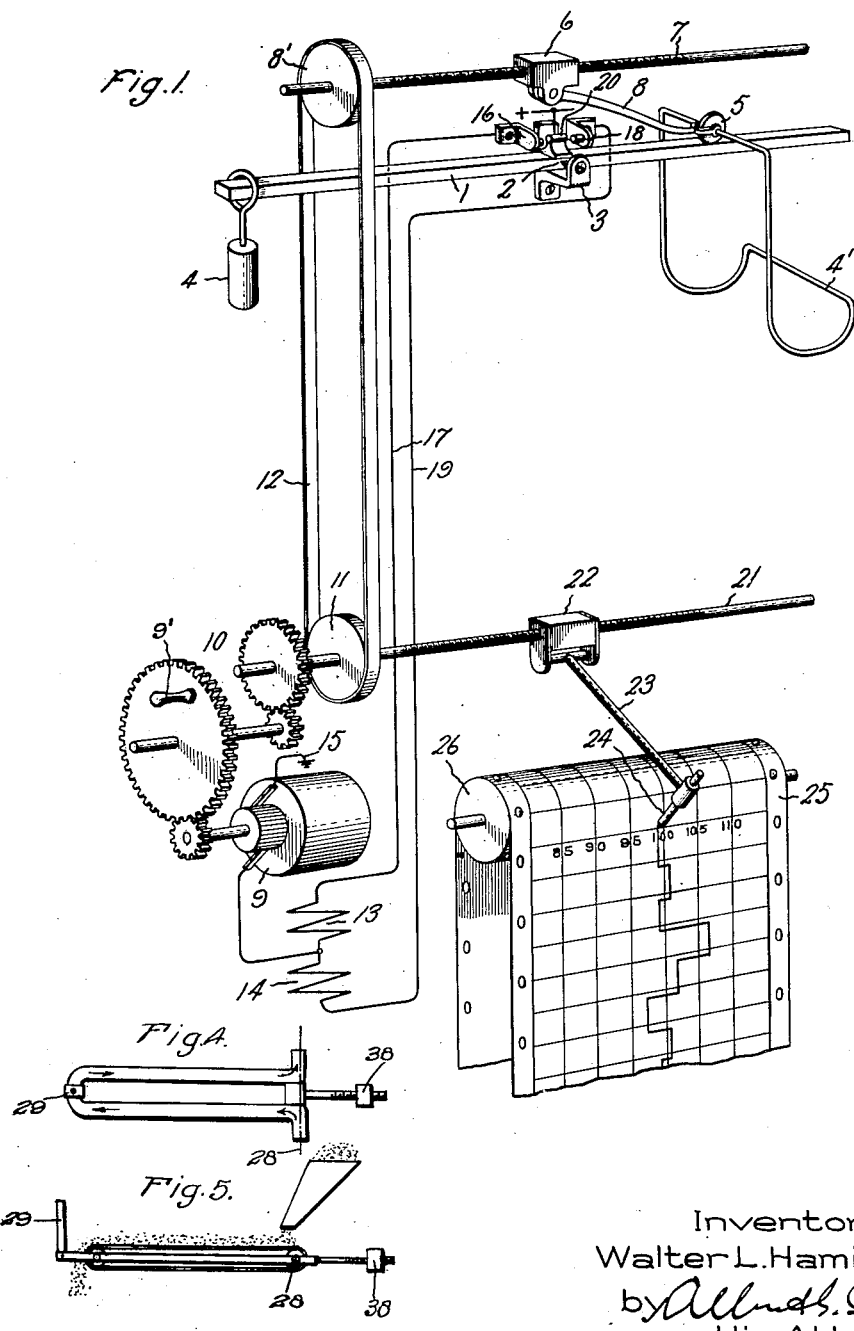
Inventor:
Walter L. Hamilton,
by Allred S. Davis
His Attorney.

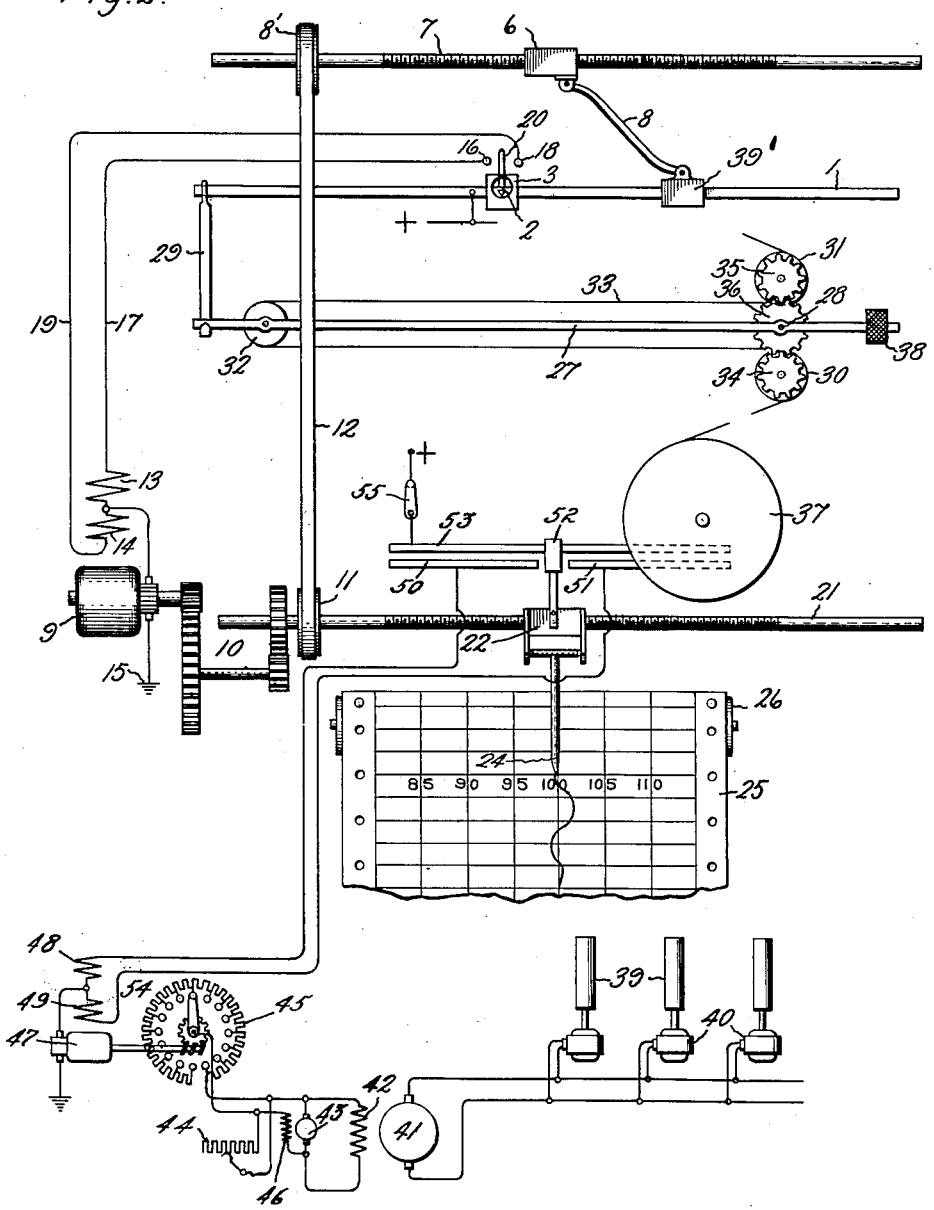

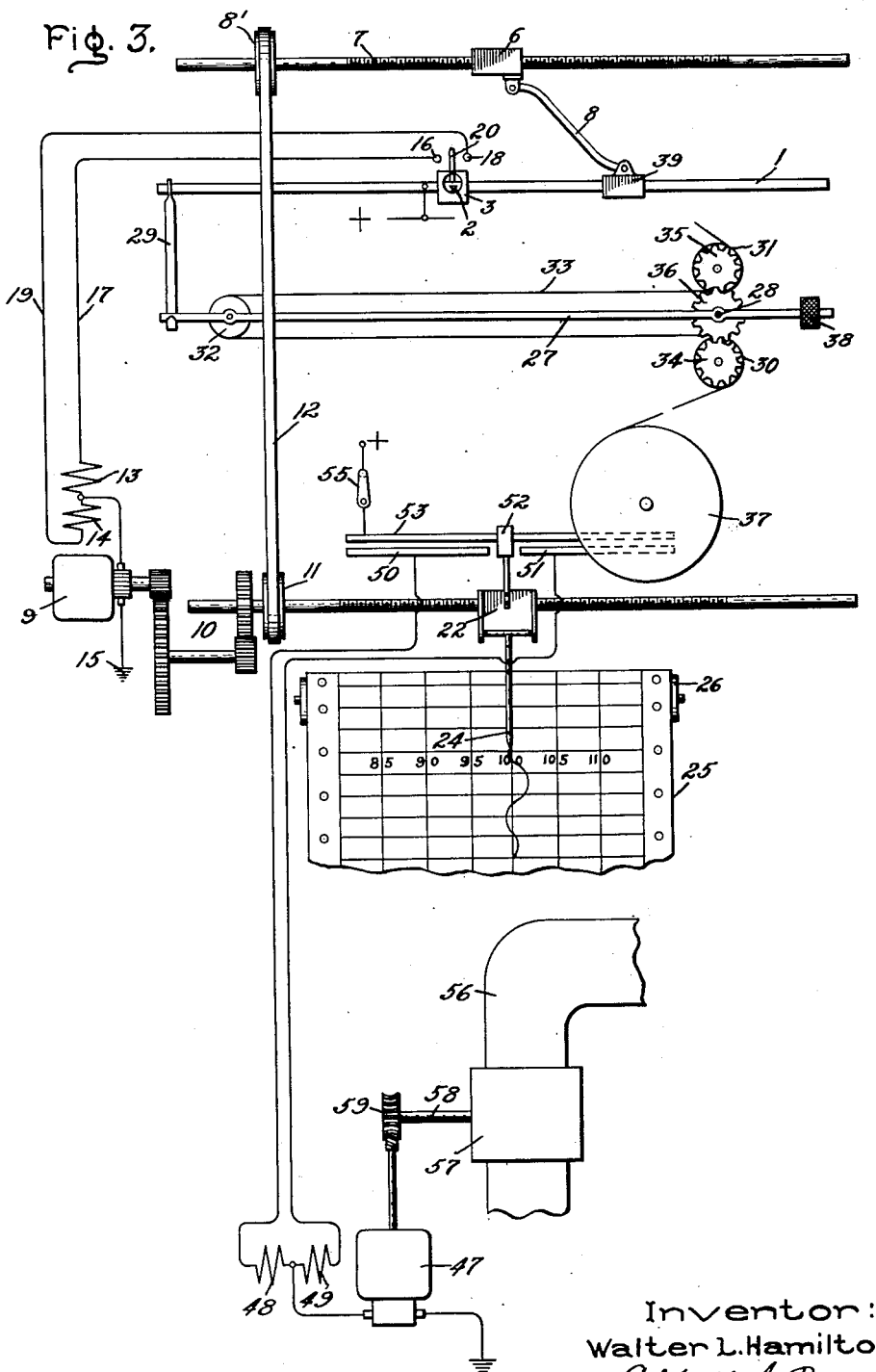

Patented Mar. 29, 1932

1,851,703

UNITED STATES PATENT OFFICE

WALTER L. HAMILTON, OF HOLYOKE, MASSACHUSETTS, ASSIGNOR TO GENERAL ELECTRIC COMPANY, A CORPORATION OF NEW YORK

WEIGHING MACHINE

Application filed May 12, 1922. Serial No. 560,399.

My invention relates to weighing machines and its primary object is to provide an improved weighing machine which performs the weighing operation automatically. A further object is to provide a machine which will weigh a definite portion of a continuously moving substance such, for example, as a rope, plastic sheets, liquids, etc. A further object of my invention is to provide such weighing machines with automatic indicating recording and controlling devices whereby a continuous record may be obtained and a corrective controlling function performed if desired. Other advantages of my invention will appear as the description proceeds.

In continuous manufacturing processes, it is often important that frequent sampling or testing of the product be made in order to be assured that it conforms to a given standard. In many such processes a convenient and reliable method of accomplishing this sampling is to weigh a definite portion of the product at frequent intervals. Thus in the manufacture of paper, it is of prime importance in order to obtain a product of uniform thickness that the weight of the paper be determined at frequent intervals in order that any deviation from the correct thickness be quickly detected and corrected. The manufacture of paper, like many other continuous manufacturing processes, is carried on night and day. The industry in general is handicapped by the lack of suitable apparatus for maintaining a constant weight of material and thus the provision of automatic devices for performing these functions will be of material benefit in decreasing the cost of manufacture and increasing the quality of the product.

While I have particularly mentioned the paper manufacturing industry and will illustrate my invention in connection therewith, I do not intend to limit my invention to this particular field as it will be evident to those skilled in the art that the broad principles thereof are applicable to weighing machines in general. Thus in the claims appended hereto, I will particularly point out the features of my invention which I believe to be novel and patentable and I will illustrate practical applications thereof by means of the following description taken in connection with the accompanying drawings, in which Fig. 1 illustrates certain aspects of my invention applied to a machine for automatically weighing detached paper samples, and Figs. 2 and 3 illustrate the preferred embodiment of my invention wherein the machine is adapted to weigh a portion of a continuously moving sheet. All of these figures illustrate one form of automatic indicating and recording device and in Figs. 2 and 3 there is illustrated means whereby the indicating device may also perform corrective controlling functions. Figs. 4 and 5 represent further modifications of my invention.

Referring now to the drawings, in which like parts are designated by similar reference characters, and more in particular to Fig. 1, 1 indicates a scale beam pivotally supported at 2 near its central portion to a stationary bracket 3. One end of this beam carries a manually adjustable weight 4 and the other end carries in this instance an automatically adjustable frame or basket 4' shaped to receive a paper sample. The basket 4' is mounted on a roller 5 which is arranged to be moved along the beam towards and away from the pivot point in accordance with the position of a nut 6. This nut is carried by a threaded shaft 7 rotatably mounted parallel to the balanced position of the scale beam. A suitable connection is provided between nut 6 and roller 5 whereby the position of the roller 5 and basket 4' is determined by the position of the nut 6 relative to shaft 7. In this instance, I have shown a mechanical connection consisting of a light rod 8 which is hinged to the nut 6 and roller 5 in a manner to allow for free oscillation of the beam 1 about its pivot. Fastened to shaft 7 is a pulley 8' which is adapted to be driven in this instance by an electric motor 9 operating through gearing 10, pulley 11 and belt 12. The motor is shown as the reversible series type provided with two field windings 13 and 14. One side of the armature is connected to ground at 15 and the other side is connected between the field windings. The other terminals of the field windings are adapted to be connected to the positive side of the line through motor reversing contacts controlled by the scale beam 1. Thus field winding 13 is connected to stationary contact 16 through lead 17, field winding 14 is connected to stationary contact 18 through lead 19, and a movable contact 20 mounted on the scale beam and electrically connected to the positive side of the line is adapted to play between these stationary contacts to close the motor circuit for one direction of rotation when weight 4 predominates, to close the motor circuit for the opposite direction of rotation when the weight contained in basket 4' predominates and to keep the motor circuit open when the scale beam is balanced. When the motor circuit is closed by the unbalancing of the scale beam, its direction of rotation is such as to move nut 6 and basket 4' in the direction to bring the scale beam back to a balanced position, at which time the motor circuit is opened and the movement stopped. It will thus be evident that if a sample of paper of given dimensions is placed in basket 4', it will be automatically weighed and the position which nut 6 assumes after a balance is reached may serve as an indication of the weight of the paper.

In the present illustration instead of attaching indicating means directly to the nut 6, I provide a similar worm and nut device for performing this function operated by the pulley 11. Thus pulley 11 is secured to a shaft 21 which has a portion of its length threaded and carries thereon a nut 22. This nut carries a pointer 23 which terminates in a stylus 24 adapted to cooperate with a recording sheet 25. The recording sheet is arranged to be advanced at a constant rate over a roller 26, by mechanism not shown in a well understood manner. When motor 9 is operated nuts 6 and 22 will move along their respective worm shafts in one direction or the other depending upon the direction of unbalancing of the beam 1 and in so doing will move basket 5 and pointer 23 until a balanced condition is reached. The stylus 24 will thus be caused to move transversely over the record sheet at right angles to the direction of movement of the latter and in so doing will draw a line thereon in a well understood manner. The record sheet is calibrated transversely in percentage weights of the paper sample or other material and lengthwise in time units. The weight 4 will be adjusted to such a position or value that when the record stylus 24 indicates 100% on the record sheet 25, with a paper sample of correct weight in the basket 4', the scale beam 1 will be in balance. In the present illustration the nut and worm devices are designed to move in opposite directions so that when nut 6 moves to the left, nut 22 will move to the right and vice versa.

The operation of the automatic weighing and recording machine may be explained as follows: Let us assume that the parts are in the position shown in Fig. 1, with a sample of standard weight paper in basket 4' and the recording sheet 25 in motion. Under these conditions, assuming that the device has been properly calibrated, beam 1 will be balanced with the stylus 24 on the 100% line of the record sheet. Now, let us replace the standard sample in basket 4' with a sample of the same lateral dimensions, say for instance, 17 x 22 inches, but which is overweight; that is to say, is slightly too thick. The right-hand end of scale beam 1 will be lowered closing the motor circuit through contacts 18 and 20, line 19 and field coil 14. The motor will start up and operate in the proper direction to move nut 6 to the left and nut 22 to the right. This will continue until basket 4' has been moved towards pivot 2 a sufficient distance to again balance the beam 1, whereupon the circuit of motor 9 will be broken at 20 and the operation stopped. Nut 22, together with pointer 23 and stylus 24, will have assumed a new position to the right of the 100% line. If the paper sample is 5% overweight, stylus 24 will be moved a corresponding amount and in so doing will draw a line on the record sheet from the 100% line to the 105% line. If the sample is underweight, the operation will be just the reverse. In order to prevent unnecessary operation of the weighing machine, it will be preferable to let the weighted sample remain in the basket until it is exchanged for the next sample. If the horizontal lines of the record sheet indicate one-half hour intervals and samples have been taken at half hour intervals, the nature of the curve obtained will be similar to that indicated in Fig. 1.

The advantage of this device is apparent. The weighing of the samples is not left to an unskilled laborer. The true weight is indicated and permanently recorded and serves not only as an indication of the character of the paper produced, but also serves to indicate how much, if any, of a corrective adjustment is necessary, the behavior of the mill and the diligence of the attendant.

In Fig. 2, I have disclosed an arrangement whereby the paper is continuously passed through the weighing machine as it comes from the mill in such a manner that its weight is continuously determined and recorded. The scale beam 1 is pivoted near its center and controls motor contacts 16 and 18 as in Fig. 1. In Fig. 2, however, the basket 4' is replaced by a long framework 27 pivoted to a stationary support near one end at 28 and fastened at its other end to one end of the scale beam 1 by a hinged rod 29. This framework is adapted to support a definite length of the paper as it comes from the mill. For this purpose I have shown a pair of spaced rollers 30 and 31 secured to the framework 27 adjacent the pivot point 28 and a roller 32 secured near the opposite end of the framework over which the paper sheet 33 is continuously passed. To secure a good mechanical construction the spaced rollers 30 and 31 may be provided with gears 34 and 35 meshing with a gear 36 rotatably mounted concentric with the pivot point 28. By this arrangement, the paper may be continuously drawn through the rolls in the following manner: The paper is fed to roll 30 from an idler roller 37, thence to roller 32, back again to roller 31 and then out to a winding roller not shown. Thus, a definite length of the paper is supported by the framework and any variation in its weight is made to influence the scale beam and weighing mechanism. The framework is preferably provided with a counterweight 38 for adjusting purposes.

It will be noted that the web 33 approaches and leaves the frame at the same angle of pull with respect to a horizontal axis passing through the pivot point of the frame. It will also be noted that the distance from the pivot point 28 to the points where the web approaches and recedes from the rollers 30 and 31 respectively is the same. Rollers 30 and 31 are also geared together by an intermediate gear 36 so that any variation in the pull on the web at roller 31 is conveyed through the gears to roller 30 and to the approaching portion of the web. Consequently any variation in this pull does not produce a variation in the turning moment of the frame about the pivot point. The only unbalanced force tending to turn the frame about the pivot point due to the pull on the web is that small amount necessary to move the web over the frame and this is constant and may be nicely balanced by adjustment of the counterweight 38. The counterweight 38 by its adjustment changes the center of gravity of the frame in a horizontal direction with respect to the pivot point and may be used to counterbalance any force or forces having a turning moment about the pivot point in the opposite direction such as the weight of the frame 27 and the pull on the web at 31 necessary to pull the web through the frame.

The weight imposed upon the scale beam 1 by the framework and paper supported thereby is arranged to be counterbalanced by a sliding weight 39 which is secured to nut 6 through the hinged rod 8. The position of nut 6 and weight 39 is controlled by the motor 9 in the same manner as in Fig. 1. Thus if the weight of the paper passing over the framework 27 increases, the left-hand end of scale beam 1 will be depressed closing contacts 16 and 20. This energizes motor 9 in the proper direction to move nut 6 and weight 39 away from pivot 2 until the scale beam 1 is again balanced, at which time the motor circuit is opened and the operation stopped.

The recording mechanism of Fig. 2 is similar to that shown in Fig. 1 except that the nut 22 thereof moves in the same direction as nut 6. The curve obtained by the continuous weighing machine follows the variation in weight of the paper passing over the framework 27 so that a visible indication and a continuous record of the weight and hence the thickness of the paper being produced is obtained. This feature provides a comprehensive and complete record of the quality of paper produced and the performance of the paper making machine. As each complete roll of paper is finished, it can be given a number and a corresponding number noted on the record sheet. Then the manufacturer has only to glance at the record sheet to ascertain the nature of the paper in any particular roll as regards its thickness. He can see at a glance whether it is good or bad as well as how much and what particular portion of the roll is bad. The length of the record sheets also give an approximate indication of the length of the paper in the roll. Any variation from a correct thickness of the paper is almost instantaneously detected by glancing at the record as it is produced. Thus, the attendant may make corrective adjustments almost immediately, whereas in the arrangement of Fig. 1 an incorrect thickness is not detected until the sample is taken. Another valuable feature of the continuous weighing machine is that the paper need never be cut except at the end of a finished roll.

Instead of making the corrective adjustments by hand, they may be accomplished automatically by devices controlled in accordance with the various positions of the nut 22. In the manufacture of paper the most important consideration as regards its thickness is the speed of the paper making rolls. Other things being equal, the thickness of the paper varies inversely as the speed of the rolls.

In Fig. 2 I have diagrammatically illustrated at 39 the rolls of a paper machine. In this instance I have represented the various rolls as being driven by individual electric motors 40 supplied in parallel from a common generator 41. The generator field 42 is supplied from an exciter 43. Adjustable resistances 44 and 45 are included in shunt to each other in the circuit of the exciter field which is designated at 46. The resistance 44 is manually adjustable and the resistance 45 is arranged to be adjusted automatically in accordance with the weight of the paper being produced by the paper machine. In the present illustration I have shown the automatic mechanism as consisting of a motor 47 having opposing fields 48 and 49, arranged similar to the motor shown at 9, and contacts 50 and 51 arranged to be separately energized by the contact 52 carried by the nut 22. The contact 52 slides on a long stationary contact 53 which is connected to the positive side of the line. When the weight of the paper is correct, the contact 52 stands in the position illustrated out of contact with both the contacts 50 and 51. Should the paper decrease in weight, the motor will be energized through field coil 48 and contacts 50, 52 and 53. The motor operates the means for adjusting the resistance 45 and in the present modification I have represented a usual form of motor operated rheostat designated in general by the numeral 54 for this purpose. When the motor is energized through field coil 48 it will operate in the proper direction to cut resistance into the exciter field circuit which will lower the current in the generator field and thus lower the voltage and speed of the motors 40. When the paper is over weight, the contact 52 will move to the right and energize the motor 47 through field coil 49 and contacts 51, 52 and 53, thereby cutting resistance out of the exciter field circuit, causing an increase in the speed of the paper machine. By properly adjusting the relative values of the parallel resistances 44 and 45 and by including a suitable anti-racing device in conjunction with the motor operated rheostat a very close automatic regulation of the paper making machinery may be obtained and thus the need of an attendant for watching the record sheet and performing manual adjustments is obviated. A switch 55 is provided for disconnecting the automatic controlling apparatus during such time as the paper machine is operating without paper and when adjustments for different weights of paper are being made.

I will now briefly review the complete operation of the apparatus of Fig. 2. With the machine in operation and a paper of the correct weight passing through the rolls, weight 38 will be adjusted until stylus 24 is on the 100% line of the record sheet when the scale beam 1 is balanced. The remainder of the record sheet will be properly calibrated with the instrument. The resistances 44 and 45 will be so adjusted that when the nut 22 and contact 52 are in this position, the machine, running under normal conditions of speed, feed, etc., will produce paper of the correct weight. Now, let us assume that the weight of the paper passing through the machine decreases. The right hand end of scale beam 1 will be depressed thereby closing the circuit of motor 9 through contacts 18 and 20, line 19 and field coil 14. The motor starts in the proper direction to move weight 39′ toward pivot 2 and nut 22 to the left. This will continue until the scale beam is balanced, at which time the operation just described will stop. The stylus 24 has in the meantime drawn a record of the decrease in weight of the paper on the continuously moving record sheet 25 and if the decrease in weight is sufficient, contact 52 will have moved to the left and energize motor 47 in the proper direction to decrease the current flowing through the exciter field causing the motors 40 to slow down. The paper machine will thus be slowed down in speed a very slight amount which under ordinary circumstances, will be sufficient to bring the weight of the paper back to its correct value and contact 52 to its central position.

The weight of the paper produced by the machine will also depend upon the amount of pulp deposited onto the usual continuously moving wire used in the initial stage of the sheet forming process. In Fig. 3 I have illustrated my weighing machine used for automatically controlling the flow of the pulp to the paper machine in accordance with the weight of the paper being produced. Such automatic controlling means may be used in conjunction with the speed control means of Fig. 2 or in conjunction with a paper machine which has automatic means for maintaining its speed constant. In Fig. 3 the feed pulp pipe to the paper machine is represented at 56. This pipe contains a valve 57 which is adapted to be controlled in the same manner as the rheostat 54 of Fig. 2. In Fig. 3 the motor 47 is connected to the valve stem 58 by the worm gear 59. The pipe 56 instead of being the main feed pipe may constitute an auxiliary pipe in parallel with the main feed pipe. When the paper passing through the weighing machine its low contact 52 will cause the motor 47 to be energized in the proper direction to open valve 57 slowly and when the paper is above the proper weight valve 57 will be closed slowly. In other respects the operation of the apparatus of Fig. 3 is similar to that of Fig. 2.

The details of construction and the purpose for which my automatic weighing machine is used may be modified a considerable extent without departing from the spirit of the invention. For instance, the apparatus of Fig. 1 might be used for weighing a definite volume of any substance. The basket 4′ might be replaced with a vessel which would be filled to a certain depth with the substance to be weighed such as cement, grain, or a liquid. The apparatus of Fig. 2 might be used to weigh a continuously moving thread, rope, wire, chain or sheets of fabric such as cloth. Or I might provide a framework of hollow tubes and pass a liquid through the same, the inlet and outlet being on the axis of the pivot point 28, as indicated in Fig. 4. This would be useful in the continuous manufacture of liquid chemicals, liquid compounds, acids, molasses, etc. Again, I might provide the framework with a continuous moving belt upon which a definite volume of a granular substance is continuously deposited at one end and dumped off at the other as indicated in Fig. 5. In each case the various parts of the apparatus would be arranged to suit the conditions and the record sheet calibrated in the proper units. In some instances it might be desirable to use a hand wheel as indicated at 9' in Fig. 1 instead of the motor 9 for moving the various parts of the apparatus in performing the weighing operation. The automatic control of the mill or other apparatus may be changed to suit the conditions. Thus, if the weighing machine were to be used with liquid compound producing apparatus, the automatic control might vary the percentages of the various elements going to make up the compound; for example, by valves controlled in accordance with the position of the nut 22 as illustrated in Fig. 3. In the production of molasses or other evaporating process, the position of the nut 22 might control the degree of heat to which the liquid is subjected. These and other modifications and uses will occur to those skilled in the art and I intend to cover in the claims appended hereto all modifications and uses which fall within the true scope of my invention.

What I claim as new and desire to secure by Letters Patent of the United States, is,—

1. A weighing machine of the type wherein the weighing operation is performed by balancing counterpoised known and unknown weights by moving one of them toward or away from the pivot of the balance, characterized by the provision of apparatus for continuously and automatically recording the position of the movable weight.

2. A weighing machine comprising in combination a horizontally disposed framework pivoted near one end and provided with rolls near its ends for supporting thereon a definite length of a continuously moving fabric and a horizontally disposed balance beam pivoted near its center and provided with an adjustable weight on one end, the other end being flexibly connected to support the free end of said pivoted framework.

3. A weighing machine of the type wherein the weighing operation is performed by balancing counterpoised known and unknown weights by moving one of them toward or away from the pivot of the balance, said machine being provided with apparatus for continuously recording the relative position of the movable weight, characterized by the provision of automatic means responsive to an unbalanced position of the machine for effecting a balance.

4. A weighing machine comprising in combination, a horizontally disposed beam pivoted near its center, a known weight supported on one end of said beam, means for continuously supporting a definite amount of a continuously moving substance on the opposite end of said beam, an electric motor for moving said weight along said beam to effect a balance and means for energizing said motor in the proper direction to effect a balance when said beam is in an unbalanced condition and for deenergizing said motor when said beam is balanced.

5. A weighing machine for determining variations in the weight of a continuously moving substance from a given standard comprising means for continuously counterpoising a sample of the substance while in motion against a known weight, recording apparatus calibrated to indicate variations in weight of the sample from the standard value and automatic means for balancing the known weight and sample and moving said recording apparatus to indicate the relative weight of said sample when a balance is reached.

6. A machine for weighing continuously moving substances comprising means for continuously counterpoising a definite amount of the continuously moving substance against an adjustable weight, automatic means for moving said weight to effect a balance and means for indicating the position of said weight.

7. A weighing machine comprising in combination, a support, means for continuously subjecting said support to the weight of a definite length of a moving sheet fabric, means for balancing the weight of the fabric thus supported and means controlled by said balancing means for recording variations in the weight of said fabric.

8. A weighing machine comprising in combination, a relatively stationary support, means for continuously subjecting said support to the weight of a definite length of a continuously moving article of manufacture, a balancing device connected to said support in a manner to be influenced by changes in the weight of the article of manufacture, automatic means for continuously balancing said device and means controlled by said automatic means for continuously indicating the weight of the article of manufacture to which said support is subjected.

9. A weighing machine comprising in combination, a horizontally disposed framework pivoted near one end and provided with rolls near its end for supporting thereon a definite length of a continuously moving fabric, a horizontally disposed balancing beam pivoted near its center and provided with an adjustable weight on one end, the other end being flexibly connected to support the free end of said pivoted framework, automatic means responsive to an unbalanced condition of said beam for moving said adjustable weight along said beam to effect a balance thereof and means for indicating the position of said weight relative to a calibrated scale whereby the weight of the fabric passing over said framework is indicated.

10. In a machine of the class described, a pivotally mounted frame, means for drawing a web over said frame continuously, means for balancing the frame against gravitational pull and the turning moment induced by the tension of the web, and means for the direct indication of the weight per unit of length of said web.

11. In a machine of the class described, a frame for supporting a predetermined portion of a web, means for causing the web to travel continuously over said frame, means for indicating the weight per unit of length of the web on said frame, and means for continuously recording said weight.

12. In a machine of the class described, a frame for supporting a predetermined portion of a web, means for causing the web to travel continuously over said frame, and means for continuously recording the weight per unit of length of the web on said frame.

13. In a machine of the class described, a pivotally mounted frame, means for drawing a web continuously over said frame, means for balancing said frame as to the factors of weight of and pull on said web, and means for indicating and recording the weight of the web on said frame.

14. In a machine of the class described, a pivotally mounted frame, means for drawing a web continuously over said frame, means for balancing said frame as to factors of weight of and pull on said web, means for varying the center of gravity of said frame, and means for continuously recording the weight of the web on said frame.

15. In a machine of the class described, a movably mounted frame for supporting a predetermined portion of a web, means for drawing the web over said frame continuously, means for balancing the frame against gravitational pull and the turning moment induced by the tension on the web, and means for the indication of the weight per unit length of said web.

In witness whereof, I have hereunto set my hand this 27th day of April, 1922.

WALTER L. HAMILTON.